United States Patent
Hasama

(10) Patent No.: US 9,429,195 B2
(45) Date of Patent: Aug. 30, 2016

(54) ROLLING BEARING APPARATUS AND LUBRICATION UNIT

(71) Applicant: JTEKT CORPORATION, Osaka-shi, Osaka (JP)

(72) Inventor: Kenta Hasama, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/801,243

(22) Filed: Jul. 16, 2015

(65) Prior Publication Data

US 2016/0025137 A1 Jan. 28, 2016

(30) Foreign Application Priority Data

Jul. 23, 2014 (JP) ................. 2014-149656

(51) Int. Cl.
*F16C 33/66* (2006.01)
*F16C 19/06* (2006.01)

(52) U.S. Cl.
CPC ............ *F16C 33/6651* (2013.01); *F16C 19/06* (2013.01); *F16C 33/6677* (2013.01)

(58) Field of Classification Search
CPC ............ F16C 33/6607; F16C 33/6622; F16C 33/6625; F16C 33/664; F16C 33/6659; F16C 33/6651; F16C 33/6677
USPC ....................... 384/462, 471, 473
See application file for complete search history.

(56) References Cited

U.S. PATENT DOCUMENTS

| 4,039,229 | A | * | 8/1977 | Ohlberg | F16C 33/6622 384/471 |
| 7,153,030 | B2 | * | 12/2006 | Katsuzawa | F16C 33/6618 384/462 |
| 2006/0165328 | A1 | | 7/2006 | Ueno et al. | |
| 2007/0071382 | A1 | * | 3/2007 | Suzuki | F16C 33/6674 384/462 |
| 2009/0180723 | A1 | * | 7/2009 | Nakamura | F16C 33/6607 384/473 |
| 2014/0341490 | A1 | | 11/2014 | Ito et al. | |

FOREIGN PATENT DOCUMENTS

| JP | 2004-108388 A | 4/2004 |
| JP | 2009-058091 A | 3/2009 |
| JP | 2013-104529 A | 5/2013 |
| JP | 2014-037878 A | 2/2014 |

* cited by examiner

Primary Examiner — Phillip A Johnson
(74) Attorney, Agent, or Firm — Oliff PLC

(57) ABSTRACT

A rolling bearing apparatus includes a lubrication unit provided adjacently to an annular space formed between an inner ring and an outer ring. The lubrication unit includes a tank that stores a lubricant to be supplied to an annular space and that has an outlet portion through which the lubricant flows out. The tank has a flexible bag in which the lubricant is stored. The bag is filled with the lubricant and allows the lubricant to flow out through the outlet portion as a volume of the bag decreases.

3 Claims, 6 Drawing Sheets

ROLLING BEARING APPARATUS AND LUBRICATION UNIT

INCORPORATION BY REFERENCE

The disclosure of Japanese Patent Application No. 2014-149656 filed on Jul. 23, 2014 including the specification, drawings and abstract, is incorporated herein by reference in its entirety.

BACKGROUND OF THE INVENTION

1. Field of the Invention

The present invention relates to a rolling bearing apparatus with a supply unit that supplies a slight amount of lubricant to a bearing portion and a lubrication unit that supplies a slight amount of lubricant to rotating components such as a rolling bearing.

2. Description of Related Art

Rolling bearings are used as spindle bearings for machine tools. Some rolling bearings adopt oil-air lubrication in order to ensure appropriate lubrication of the rolling bearing (see, for example, Japanese Patent Application Publication No. 2009-58091 (JP 2009-58091 A)). However, the oil-air lubrication involves high running costs due to air consumption and needs incidental facilities such as an oil-air supply apparatus and an air clean unit, possibly leading to high facility costs.

As another means for lubricating a rolling bearing, a bearing apparatus incorporating a lubrication unit is known (see, for example, Japanese Patent Application Publication No. 2004-108388 (JP 2004-108388 A)). In the bearing apparatus, an annular lubrication unit is installed on a fixed bearing ring (fixed ring) of an inner ring and an outer ring, and the rolling bearing and the lubrication unit are integrated together. The lubrication unit includes a tank in which a lubricant is stored and a pump that discharges the lubricant in the tank into an annular space between the inner ring and the outer ring.

A slight amount of lubricant is discharged from the pump. The amount of lubricant discharged is adjusted by controlling operations of the pump. In a bearing apparatus including such a lubrication unit as described above along with a rolling bearing, a slight amount of lubricant can be discharged into the annular space formed between the inner ring and the outer ring. The discharged lubricant adheres to raceway surfaces of the inner and outer rings and to rolling elements, thus allowing the rolling bearing to be lubricated.

For a tank for the lubrication unit as described above, it is conventionally preferable that an outlet port (outlet portion) through which the lubricant flows out be formed at the lowest position. The reason is as follows. If the outlet port is formed at a slightly high position in the tank, when the amount of the lubricant decreases to the degree that the surface of the lubricant is lower than the outlet port, air in the tank flows out through the outlet port. Furthermore, the lubricant in an area lower than the outlet port remains unused. Thus, in the related art, when the outlet port is not formed at the lowest position, the lubricant in the tank may fail to be used up.

SUMMARY OF THE INVENTION

An object of the present invention is to provide a rolling bearing apparatus and a lubrication unit that enable a lubricant in a tank of the lubrication unit to be used up.

A rolling bearing apparatus in an aspect of the present invention includes a bearing portion having an inner ring, an outer ring, a plurality of rolling elements interposed between the inner ring and the outer ring, and a cage that holds the rolling elements such that the rolling elements are arranged in a circumferential direction, and a lubrication unit including a tank that stores a lubricant to be supplied to an annular space formed between the inner ring and the outer ring and that has an outlet portion through which the lubricant flows out. The lubrication unit is provided adjacently to the annular space. The tank has a flexible bag in which the lubricant is stored. The bag is filled with the lubricant and allows the lubricant to flow out through the outlet portion as a volume of the bag decreases.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
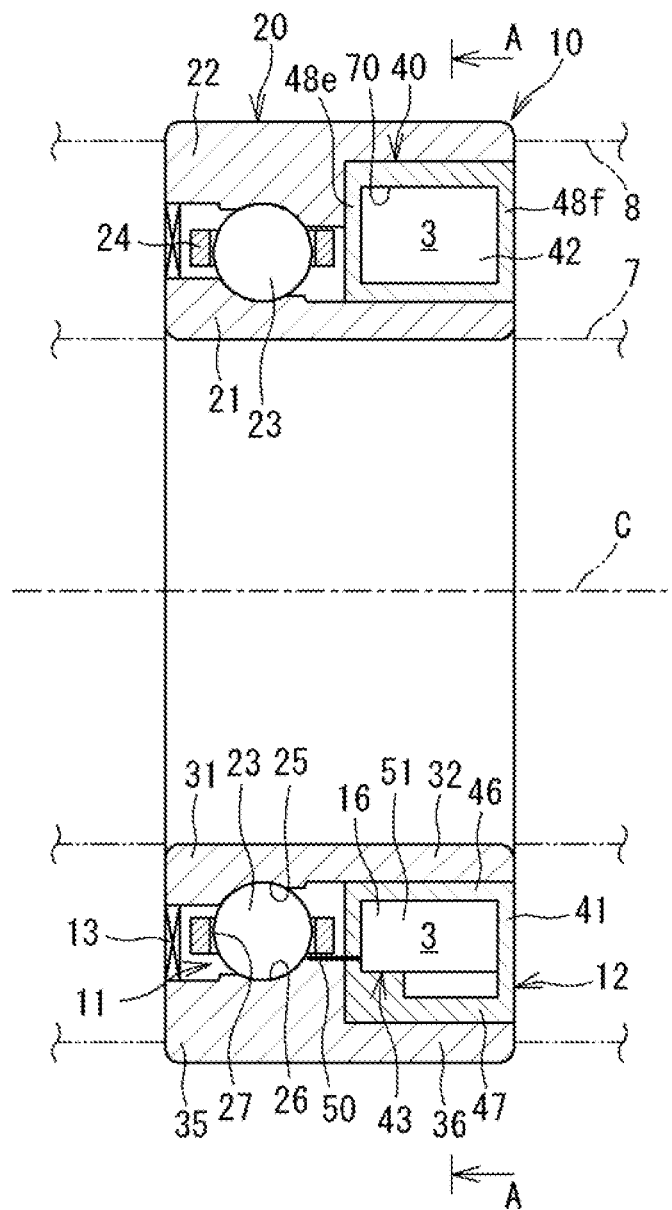
FIG. 1 is a longitudinal sectional view of a rolling bearing apparatus.
Figure 2:
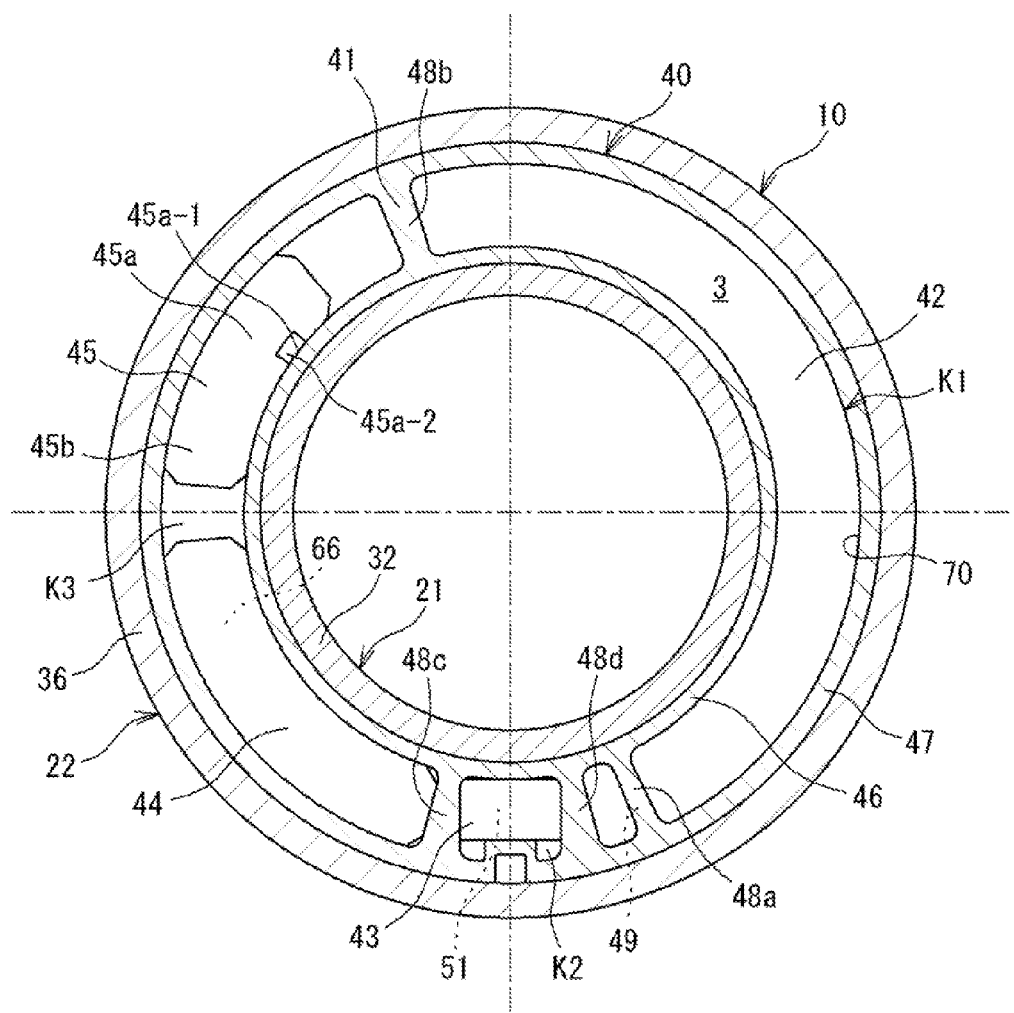
FIG. 2 is a transverse sectional view of the rolling bearing apparatus depicted in FIG. 1.

An embodiment of a rolling bearing apparatus will be described. FIG. 1 is a longitudinal sectional view of a rolling bearing apparatus 10. FIG. 2 is a transverse sectional view of the rolling bearing apparatus 10 depicted in FIG. 1. FIG. 2 is a cross-sectional view taken along line A-A in FIG. 1. As depicted in FIG. 1, the rolling bearing apparatus 10 includes a bearing portion 20 and a lubrication unit 40. The rolling bearing apparatus 10 in the present embodiment is housed in a bearing housing 8 in order to support a spindle (shaft 7) of a machine tool so as to enable rotation of the spindle.

The bearing portion 20 has an inner ring 21, an outer ring 22, a plurality of balls (rolling elements) 23, and a cage 24 that holds the balls 23. The inner ring 21 includes a cylindrical member externally fitted over the shaft 7. The inner ring 21 has an inner ring main body portion 31 on a first side in an axial direction (in FIG. 1, the left side) and an inner ring extension portion 32 on a second side in the axial direction (in FIG. 1, the right side). As a raceway surface, a raceway groove (hereinafter referred to as an inner ring raceway groove 25) is formed on an outer periphery of the inner ring main body portion 31. In the present embodiment, the inner ring main body portion 31 and the inner ring extension portion 32 are integrated together and are indivisible but may be separate from each other. In other words, the inner ring extension portion 32 may be a ring-shaped spacer. The outer ring 22 includes a cylindrical member fixed to an inner peripheral surface of the bearing housing 8. The outer ring 22 has an outer ring main body portion 35 on the first side in the axial direction and an outer ring extension portion 36 on the second side in the axial direction. As a raceway surface, a raceway groove (hereinafter referred to as an outer ring raceway groove 26) is formed on an inner periphery of the outer ring main body portion 35. In the present embodiment, the outer ring main body portion 35 and the outer ring extension portion 36 are integrated together and are indivisible but may be separate from each other. In other words, the outer ring extension portion 36 may be a ring-shaped spacer.

The balls 23 are interposed between the inner ring main body portion 31 and the outer ring main body portion 35 and roll in the inner ring raceway groove 25 and the outer ring raceway groove 26. The cage 24 includes an annular member and has a plurality of pockets 27 formed along a circumferential direction. The cage 24 has a pair of ring portions and pillar portions that join the ring portions together. In the cage 24, the pockets 27 are each formed between the ring portions and a pair of the pillar portions that are adjacent to each other in the circumferential direction. Each of the balls 23 is housed in a corresponding one of the pockets 27. Thus, the cage 24 can hold the plurality of balls 23 so as to arrange the balls 23 in the circumferential direction. In the present invention, the balls 23 are in contact with the raceway grooves 25 and 26 at a certain contact angle. The bearing portion 20 is an angular ball bearing. When the rolling bearing apparatus 10 is used for a machine tool, the pockets 27 are typically cylindrical.

A first annular space 11 is formed between the inner ring main body portion 31 and the outer ring main body portion 35. A second annular space 12 is formed between the inner ring extension portion 32 and the outer ring extension portion 36. The first annular space 11 and the second annular space 12 are contiguous with each other. A seal member 13 is provided on the first side of the first annular space 11 in the axial direction to prevent a lubricant inside the bearing where the balls 23 and the cage 24 are present from escaping to the exterior of the bearing. Although not depicted in the drawings, a seal member may be provided between the first annular space 11 and the second annular space 12. The seal member may be provided outside the bearing as long as the lubricant inside the bearing can still be prevented from escaping to the exterior.

The balls 23 and the cage 24 are provided in the first annular space 11. The lubrication unit 40 is provided in the second annular space 12. In the present embodiment, the inner ring 21, which is a rotating bearing ring, rotates along with the shaft 7 with respect to the outer ring 22, which serves as a fixed bearing ring. Thus, the lubrication unit 40 is fitted on and attached to an inner peripheral surface of the outer ring extension portion 36 in a close contact manner. In contrast, a very small gap is formed between an outer peripheral surface of the inner ring extension portion 32 and an inner peripheral surface of the lubrication unit 40 (an annular frame 41 described below) to prevent the lubrication unit 40 from hindering rotation of the inner ring 21.

As depicted in FIG. 2, the lubrication unit 40 is generally shaped like a ring. The lubrication unit 40 includes a frame 41, a tank 42, a pump 43, a circuit section 44, and a power supply section 45. The frame 41 is, for example, an annular member formed of resin and has a short-cylinder-shaped inner peripheral wall 46, a short-cylinder-shaped outer peripheral wall 47, and a plurality of partition walls 48a, 48b, 48c, and 48d provided between the peripheral walls 46 and 47, and sidewalls 48e and 48f (see FIG. 1). The walls define a plurality of spaces K1, K2, and K3 along the circumferential direction.

A tank 42 is provided in the first space K1. The lubricant 3 to be supplied to the first annular space 11 is stored in the tank 42. In the present embodiment, a flexible bag 70 is provided the first space K1, and the lubricant 3 is stored in the bag 70. In other words, the tank 42 has the bag 70 in which the lubricant 3 is stored. The bag 70 will further be described below.

The pump 43 is stored in the second space K2. The circuit section 44 and the power supply section 45 are stored in the third space K3. Thus, the frame 41, the tank 42, the pump 43, the circuit section 44, and the power supply section 45 are integrated to form the lubrication unit 40.

The lubrication unit 40 is detachably attached to the outer ring 22 (outer ring extension portion 36), which serves as the fixed bearing ring. The lubrication unit 40 is integrated with the bearing portion 20. As depicted in FIG. 1, the lubrication unit 40 provided in the second annular space 12 is provided adjacently to the first annular space 11 in the axial direction.

The tank 42 includes the bag 70 in which the lubricant 3 is stored as described above. The bag 70 has, in a part thereof, an outlet port (outlet portion) 49 through which the stored lubricant 3 flows out to the pump 43. The outlet port 49 and the pump 43 (a housing portion 51 described below) are joined together through a channel (not depicted in the drawings).

The power supply section 45 has a power generating section 45a and a secondary battery section 45b. The power generating section 45a is configured such that rotation of the inner ring 21 enables the power generating section 45a to generate power. In other words, a rotor 45a-1 is provided on an outer periphery of the inner ring extension portion 32. The power generating section 45a has a stator 45a-2 provided on an inner periphery of the frame 41. The rotor 45a-1 is magnetized so as to alternately provide N poles and S poles along the circumferential direction. The stator 45a-2 is formed of a magnetic material and is provided such that the rotor 45a-1 passes through a radially inner side of the stator 45a-2. Power generated by the power generating section 45a is stored in the secondary battery section 45b.

The circuit section 44 includes a circuit board including a programmed microcomputer and transmits control signals (driving signals) to the pump 43. In other words, the circuit section 44 provides driving power (applies a predetermined voltage) to the pump 43. The circuit section 44 has a function to execute various processes besides the function to drive the pump 43 (driving control section). For example, the circuit section 44 can acquire a signal from a sensor (not depicted in the drawings) provided in the lubrication unit 40. Based on the signal, the circuit section 44 can execute various processes.

Figure 3:
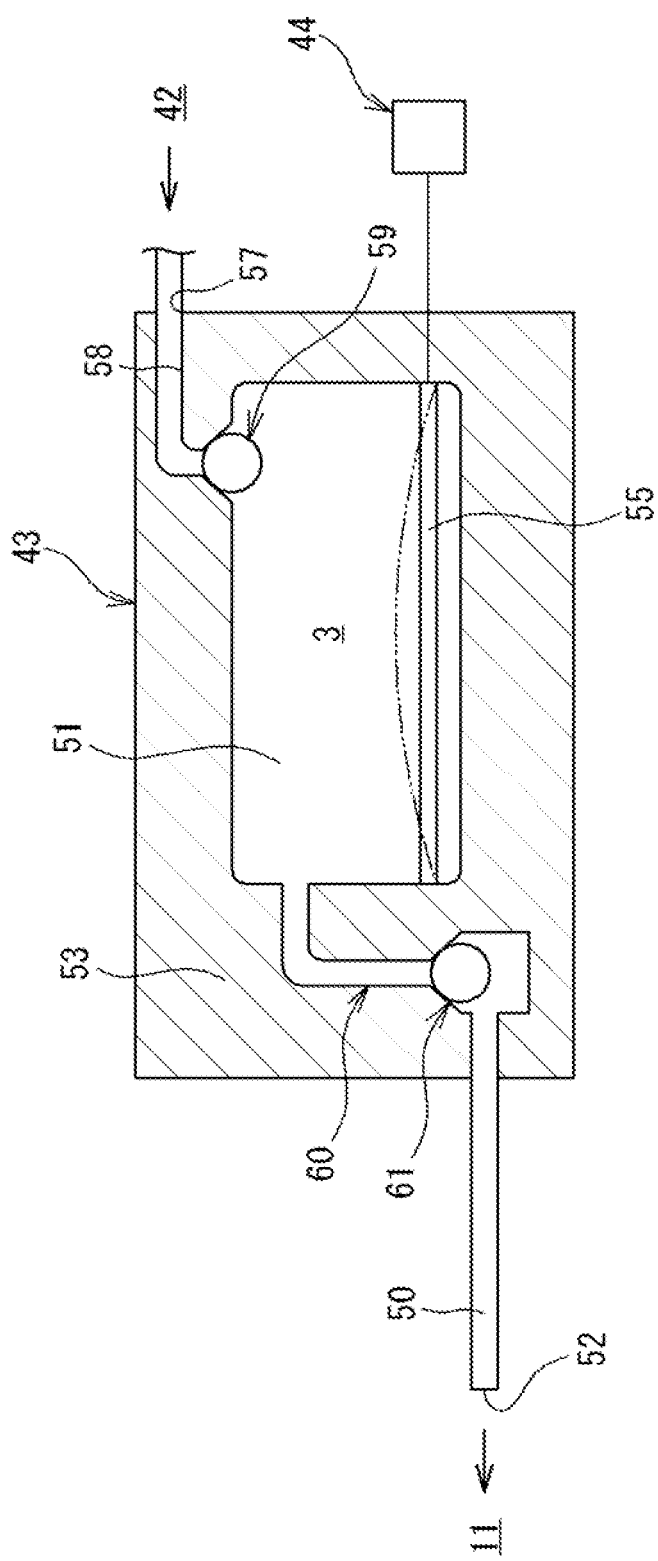
FIG. 3 is a sectional view illustrating a pump.

FIG. 3 is a sectional view illustrating the pump 43. The pump 43 includes a small pump (micro pump) and is attached to a part (lower part) of the frame 41 (see FIG. 2). As depicted in FIG. 3, the pump 43 includes a case 53, a nozzle 50, the housing portion 51, and a piezoelectric element 55. The nozzle 50 is provided so as to extend from the case 53. The housing portion 51 stores the lubricant 3. The piezoelectric element 55 is used to discharge the lubricant.

The pump 43 has an upstream side channel 58 and a first check valve 59. The upstream side channel 58 joins the housing portion 51 to an inlet port 57 through which the lubricant 3 having flowed from the tank 42 flows into the pump 43. The first check valve 59 prevents the lubricant 3 in the housing portion 51 from flowing back toward the tank 42 side. The pump 43 further has a downstream side channel 60 and a second check valve 61. The downstream side channel 60 connects the housing portion 51 and the nozzle 50 together. The second check valve 61 is provided in the middle of the downstream side channel 60 to prevent the lubricant 3 from flowing back from the nozzle 50 to the housing portion 51.

The housing portion 51 includes a space formed in the case 53. The housing portion 51 is filled with the lubricant 3. The pump 43 has the piezoelectric element 55 as a driving portion that drives the lubricant 3 in the housing portion 51 to discharge the lubricant 3 into the first annular space 11.

The piezoelectric element 55 is shaped like a plate and provides a part of an inner wall of the housing portion 51. When a voltage is applied to the piezoelectric element 55, the piezoelectric element 55 is deformed (displaced), and the deformation causes a reduction in the volume of the housing portion 51 to discharge the lubricant 3 in a full state in the housing portion 51, into the first annular space 11 through the nozzle 50. The deformed piezoelectric element 55 is depicted by a long dashed double-short dashed line in FIG. 3. To facilitate the understanding, the deformed state is exaggerated compared to the reality. The full state of the lubricant 3 in the housing portion 51 refers to a state where the housing portion 51 is full of the lubricant 3 and where, when the piezoelectric element 55 is deformed to reduce the volume of the housing portion 51, the internal pressure of the lubricant 3 in the housing portion 51 significantly rises. Then, when the piezoelectric element 55 recovers the original shape, the first check valve 59 is opened to allow the lubricant 3 in the tank 42 to be sucked into the housing portion 51.

Application of a voltage to the piezoelectric element 55 and a timing for the application of the voltage are controlled by the circuit section 44 (see FIG. 2). The power applied to the piezoelectric element 55 is supplied by the power supply section 45 (secondary battery section 45b). A pulsed voltage is applied to the piezoelectric element 55 to allow the lubricant 3 to be intermittently discharged. A slight amount of discharge can be achieved by controlling the number of pulses and the value of the voltage applied to the piezoelectric element 55.

The pump 43 is driven as described above to discharge the lubricant 3 in the pump (housing portion 51) to the exterior of the pump through the nozzle 50. The nozzle 50 is shaped like a needle and has a discharge port 52 at a tip of the nozzle 50. The discharge port 52 is open at the tip (tip surface) of the nozzle 50, and through the discharge port 52, the lubricant 3 is discharged toward the outer ring raceway groove 26 of the outer ring 22 (see FIG. 1), which serves as the fixed bearing ring. A longitudinal direction of the nozzle 50 is present on a plane containing a center line of the rolling bearing apparatus 10.

Now, the amount of the lubricant 3 discharged by the pump 43 will be described. When the pump 43 receives the driving signal (control signal) from the circuit section 44, the piezoelectric element 55 is driven to discharge the lubricant 3 through the nozzle 50 in the form of droplets. A constant amount (appropriately constant amount) of droplets of the lubricant 3 are discharged by a single driving operation of the pump 43 (piezoelectric element 55). The amount (volume) of droplets discharged per driving operation (shot) of the pump 43 may be five picoliters to seven microliters or may be set to one nanoliter to 1,000 nanoliters or five picoliters to 1,000 picoliters. The frequency of this lubrication (time intervals between shots) may be every several seconds, every several minutes, or every several hours. As described above, the pump 43 allows the lubricant 3 to be intermittently supplied (at regular time intervals) to the first annular space 11 (see FIG. 1) formed between the inner ring 21 and the outer ring 22. The rolling bearing apparatus 10 with the lubrication unit 40 as described above enables a slight amount of the lubricant 3 to be supplied to the bearing portion 20 and is also referred to as a nano-lubrication bearing.

Figure 4:
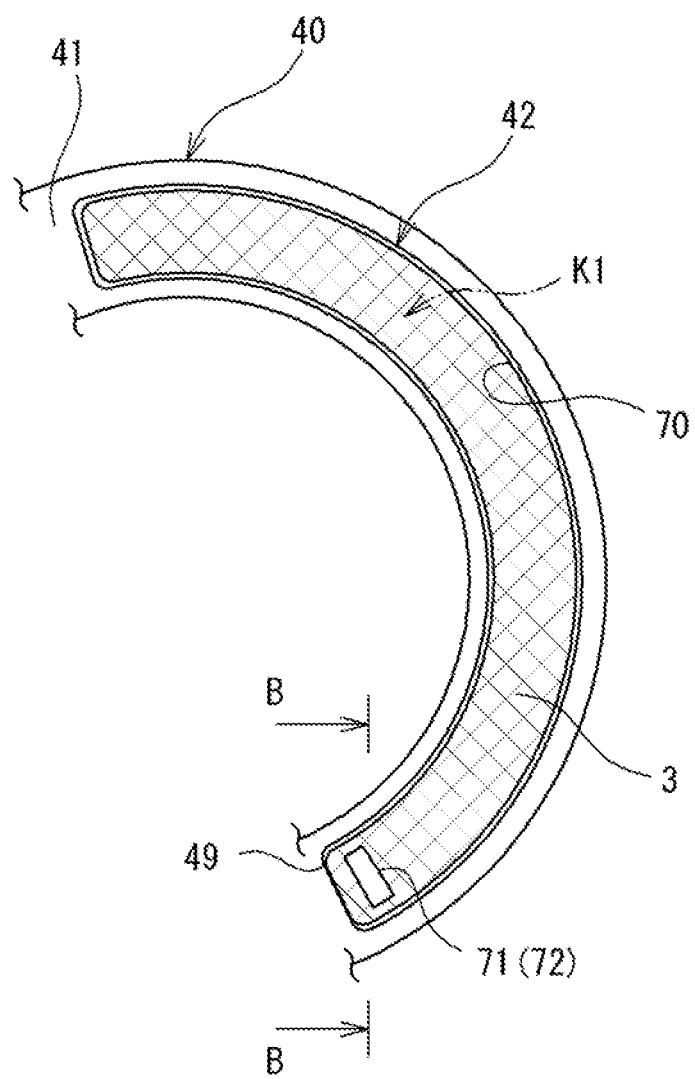
FIG. 4 is a transverse sectional view of a tank provided in a lubrication unit.
Figure 5:
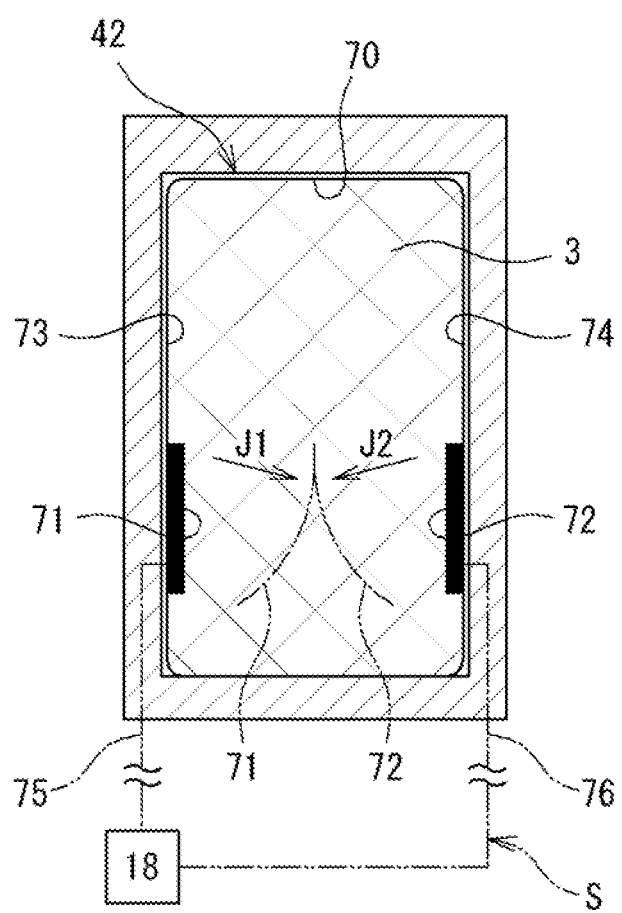
FIG. 5 is a sectional view of the tank depicted in FIG. 4, taken along line B-B in FIG. 4.

FIG. 4 is a transverse sectional view illustrating the tank 42 provided in the lubrication unit 40. FIG. 4 depicts an unused state where no amount of the lubricant 3 stored in the bag 70 in the tank 42 has flown out through the outlet port 49. FIG. 5 is a sectional view of the tank 42 depicted in FIG. 4, taken along line B-B in FIG. 4. The bag 70 is flexible, and is formed of, for example, a thin-film-like soft synthetic resin. The bag 70 is formed of a soft material. The material may or may not be stretchable. The bag 70 has the same size as that of the space K1 in the frame 41.

The bag 70 has a small opening only in a part thereof. The small opening corresponds to the outlet port 49 through which the lubricant 3 flows out. The bag 70 is open only at the outlet port 49, and the remaining part of the bag 70 is sealed. The lubricant 3 is enclosed in the bag 70. Even when the lubricant 3 flows out through the outlet port 49, the air surrounding the bag 70 is prevented from entering the bag 70.

Figure 6:
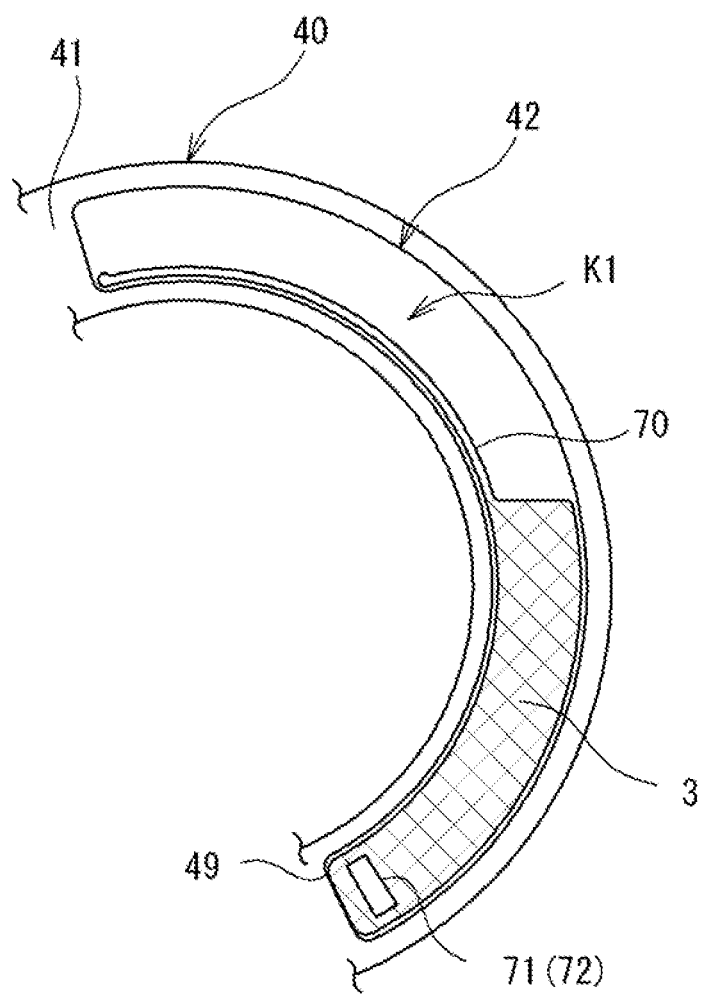
FIG. 6 is a diagram depicting an in-use state where an approximately half amount of stored lubricant has flown out.

The bag 70 is filled with the lubricant 3. In other words, in the unused state depicted in FIG. 4, the bag 70 contains no air bubble having a larger volume than the droplet of the lubricant 3 discharged through the nozzle 50 (see FIG. 3) and is filled with the lubricant 3. FIG. 6 depicts an in-use state where an approximately half amount of the lubricant 3 has flown out. As depicted in FIG. 6, even in the in-use state, the bag 70 contains no air bubble having a larger volume than the droplet of the lubricant 3 discharged through the nozzle 50 (see FIG. 3) and is filled with the lubricant 3. Thus, the volume of the bag 70 is equal to the amount (volume) of the lubricant 3. In a used-up state where all of the stored lubricant 3 has flown out through the outlet port 49, the bag 70 is empty.

As described above, the bag 70 is filled with the lubricant 3. The bag 70 is entirely sealed except for the outlet port 49. Consequently, opening the first check valve 59 (see FIG. 3) enables the lubricant 3 in the bag 70 to flow out. In this state where the lubricant 3 is enabled to flow out, the lubricant 3 is allowed to flow out to the exterior through the outlet port 49 as the volume of the bag 70 decreases as depicted in FIG. 4 and FIG. 6. Thus, the lubricant 3 in the tank 42 can be used up. In particular, even when the outlet port 49 is not formed at the lowest position in the tank 42, the lubricant 3 can be used up.

To allow the lubricant 3 to flow out more easily as the volume of the bag 70 decreases, the bag 70 may be configured such that an internal space in the bag 70 is wide at the outlet port 49 and narrow (flat) in an area away from the outlet port 49. For example, the bag 70 may be shaped such that the internal space in the bag 70 is narrower (flatter) away from the outlet port 49. Consequently, outflow of the lubricant 3 enables the bag 70 to contract sequentially starting with a part of the bag 70 away from the outlet port 49 and ending with a part of the bag 70 near the outlet port 49.

The lubrication unit 40 of the present embodiment has a function to manage the insufficiency of the lubricant 3 to be supplied to the first annular space 11. That is, the tank 42 in which the lubricant 3 is stored is accommodated in the bearing housing 8 along with the bearing portion 20 as described above. Thus, checking (visually checking) the lubricant 3 remaining in the lubrication unit 40 is not easy. Even if all of the lubricant 3 in the lubrication unit 40 including the tank 42 and the pump 43 has been used and the lubrication unit 40 is empty, when this is not noticed and the lubricant 3 adhering to the balls 23 and the raceway grooves 25 and 26 is lost, the rolling bearing apparatus 10 is used in an unlubricated state, leading to seizure or the like. Thus, the rolling bearing apparatus 10 of the present embodiment has a configuration that enables the insufficiency of the lubricant 3 in the lubrication unit 40 to be sensed.

This configuration will be specifically described. As depicted in FIG. 5, electrodes 71 and 72 are attached to opposite inner surfaces 73 and 74, respectively, of the bag 70. As depicted in FIG. 4, the electrodes 71 and 72 are provided on the inner surfaces 73 and 74 of the bag 70 in areas near the outlet port 49. A first wire 75 is connected to the first electrode 71. A second wire 76 is connected to the second electrode 72. The wires 75 and 76 are led out from the lubrication unit 40 and connected to a detection apparatus 18 provided outside the rolling bearing apparatus 10. The detection apparatus 18 applies a voltage to one of the electrodes 71 and 72 through the wire 75 or 76, respectively. When the electrodes 71 and 72 come into contact with each other, a closed circuit S including the wires 75 and 76 and the electrodes 71 and 72 is formed. A current flows through the circuit S, and the detection apparatus 18 is configured to measure a current value, a voltage value, or a resistance value for the electricity flowing through the circuit S.

As described above, the bag 70 is flexible. The volume of the bag 70 decreases as the lubricant 3 flows out through the outlet port 49. Thus, as depicted by arrows J1 and J2 in FIG. 5, a decrease in the amount of the lubricant 3 causes the inner surfaces 73 and 74 to approach each other, eventually bringing the electrodes 71 and 72 into contact with each other. Then, the detection apparatus 18 detects electric continuity of the circuit S including the electrodes 71 and 72. Upon detecting the electric continuity, the detection apparatus 18 outputs a detection signal. The detection signal indicates that the amount of the lubricant 3 has decreased and is likely to shortly reach zero. As described above, the wires 75 and 76 electrically connected to the electrodes 71 and 72 function as wiring sections that allow detection of the electric continuity of the circuit S formed as a result of the contact between the electrodes 71 and 72.

The detection signal output from the detection apparatus 18 can be received, in the present embodiment, by a control apparatus for a machine tool. Upon acquiring the detection signal, the control apparatus outputs information indicating that the amount of the lubricant 3 in the rolling bearing apparatus 10 is likely to be insufficient. For example, information indicative of the insufficiency is output to a monitor of the control apparatus. Upon viewing this, an operator can do maintenance work on the rolling bearing apparatus 10. The detection apparatus 18 may be a part of the control apparatus for the machine tool. Alternatively, the detection apparatus 18 may be provided inside the rolling bearing apparatus 10 (lubrication unit 40). The circuit section 44 may include the detection apparatus (detection section) 18 as a part of the function of the circuit section 44.

As described above, the lubrication unit 40 has the pair of electrodes 71) and 72 and the wires 75 and 76. The electrodes 71 and 72 are provided on the opposite inner surfaces 73 and 74 of the bag 70. The wires 75 and 76 are wiring sections that allow detection of the electric continuity of the circuit S formed as a result of the contact between the electrodes 71 and 72. In this configuration, a decrease in the amount of the lubricant 3 remaining in the bag 70 causes the opposite inner surfaces 73 and 74 of the bag 70 to approach each other, eventually brining the inner surfaces 73 and 74 into contact with each other. The electrodes 71 and 72 are provided on the inner surfaces 73 and 74, respectively. Thus, the circuit S may be made electrically continuous which is formed as a result of the contact between the electrodes 71 and 72 and including the electrodes 71 and 72 and the wires 75 and 76. The electric continuity is then detected by the detection apparatus 18 to enable determination of a decrease in the amount of the lubricant 3 in the tank 42. As a result, the bearing portion 20 can be prevented from being used in the unlubricated state.

In particular, the electrodes 71 and 72 are provided on the inner surfaces 73 and 74, respectively, of the bag 70 in the areas near the outlet port 49. As the lubricant 3 is consumed, the bag 70 contracts starting with a part thereof away from the outlet port 49. This configuration enables detection of the likelihood that the lubricant 3 remaining the bag 70 will shortly be exhausted. In particular, the electrodes 71 and 72 preferably come into contact with each other when the lubricant 3 in the bag 70 is exhausted.

In the above-described embodiment, the case has been described where the rotating bearing ring is the inner ring 21, whereas the fixed bearing ring is the outer ring 22. However, it is also preferable that the rotating bearing ring be the outer ring 22, whereas the fixed bearing ring be the inner ring 21. Moreover, although not depicted in the drawings, the rolling bearing apparatus 10 may further include, in the frame 41, various sensors that detect temperature, vibration, an oil film condition on the raceway surface, and the like so that the circuit section 44 can determine (change) driving conditions (the amount of lubricant discharged by a single operation and discharge intervals) for the pump 43 based on detection signals from the sensors.

In the above-described embodiments, the lubrication unit 40 is integrated with the bearing portion 20 to provide the rolling bearing apparatus 10. However, the lubrication unit 40 may be used with another component or the like. For example, the lubrication unit 40 may be combined with a rotating component such as a one-way clutch or a ball screw. In this case, the lubrication unit 40 includes the tank 42 in which the lubricant 3 to be supplied to a lubrication-needed area of the rotating component is stored. The lubrication unit 40 is further provided adjacently to the lubrication-needed area. The tank 42 has the outlet port 49 through which the lubricant 3 inside the tank 42 flows out. Moreover, the tank 42 has the flexible bag 70 in which the lubricant 3 is stored. The bag 70 is filled with the lubricant 3, and allows the lubricant 3 to flow out through the outlet port 49 as the volume of the bag 70 decreases.

The rolling bearing apparatus 10 and the lubrication unit 40 in the present invention are not limited to the illustrated forms but may be in any other form within the scope of the present invention. For example, in the above-described embodiments, the case has been described where the lubrication unit 40 includes the power supply section 45 in the frame 41. However, the power supply section 45 may be provided outside the frame 41. In this case, the circuit section 44 (pump 43) in the frame 41 and the external power supply section 45 are connected together through a cable. Furthermore, in the above-described embodiments of the rolling bearing apparatus 10, the bearing portion 20 is a ball bearing. However, the bearing portion 20 may be a roller bearing.

In the above-described embodiment, the lubrication unit 40 has been described which enables the lubricant 3 in the tank 42 to be used up. A rolling bearing apparatus (referential invention) intended to solve another problem will be described. The problem is as follows. In a bearing apparatus with a conventional lubrication unit (for example, JP 2004-108388 A described above), the tank in which the lubricant is stored is accommodated in the bearing housing along the rolling bearing. Consequently, checking the amount of the lubricant remaining in the lubrication unit is not easy. Thus, even if all of the lubricant in the lubrication unit including the tank and the pump has been used and the lubrication unit is empty, when this is not noticed and the lubricant adhering to the rolling elements and the raceway surfaces is subsequently lost, the rolling bearing is used in the unlubricated state, leading to seizure or the like.

Thus, the referential invention is a rolling bearing apparatus that enables the insufficiency of the lubricant in the lubrication unit to be sensed. An aspect of the referential invention is as follows. To facilitate understanding of the referential invention, the reference numerals used in the above-described embodiment are used for the referential invention. That is, the rolling bearing apparatus 10 according to the referential invention includes the bearing portion 20 having the inner ring 21, the outer ring 22, the plurality of balls (rolling elements) 23 interposed between the inner ring 21 and the outer ring 22, and the cage 24 that holds the balls 23 such that the balls 23 are arranged in the circumferential direction, and the lubrication unit 40 including the tank 42 that stores the lubricant 3 to be supplied to the annular space 11 formed between the inner ring 21 and the outer ring 22 and that has the outlet port (outlet portion) 49 through which the lubricant 3 flows out. The lubrication unit 40 is provided adjacently to the annular space 11. The tank 42 has the flexible bag 70 in which the lubricant 3 is stored. The lubrication unit 40 further has the pair of electrodes 71 and 72 provided on the opposite inner surfaces 73 and 74, respectively, of the bag 70 and the wiring sections (75 and 76) electrically connected to the electrodes 71 and 72, respectively, to detect the electric continuity of the circuit S formed as a result of the contact between the electrodes 71 and 72.

In this configuration, a decrease in the amount of the lubricant 3 remaining in the bag 70 causes the pair of inner surfaces 73 and 74 of the bag 70 to approach each other, eventually bringing the inner surfaces 73 and 74 into contact with each other. The electrodes 71 and 72 are provided on the inner surfaces 73 and 74, respectively. Consequently, the circuit S can be made electrically continuous which is formed as a result of the contact between the electrodes 71 and 72. Detection of the electric continuity enables detection of a decrease in the amount of the lubricant 3 in the tank 42.

The configurations according to the above-described embodiment described with reference to FIGS. 1 to 5 are applicable to the referential invention.

The rolling bearing apparatus and the lubrication unit of the present invention enable the lubricant in the tank to be used up.

What is claimed is:

1. A rolling bearing apparatus comprising:
   a bearing portion having an inner ring, an outer ring, a plurality of rolling elements interposed between the inner ring and the outer ring, and a cage that holds the rolling elements such that the rolling elements are arranged in a circumferential direction; and
   a lubrication unit including a tank that stores a lubricant to be supplied to an annular space formed between the inner ring and the outer ring and that has an outlet portion through which the lubricant flows out, the lubrication unit being provided adjacently to the annular space, wherein
   the tank has a flexible bag in which the lubricant is stored,
   the bag is filled with the lubricant and allows the lubricant to flow out through the outlet portion as a volume of the bag decreases, and
   the lubrication unit further includes a pair of electrodes provided on opposite inner surfaces of the bag, and wiring sections electrically connected to the respective electrodes to detect electric continuity of a circuit formed as a result of contact between the electrodes.

2. The rolling bearing apparatus according to claim 1, wherein
   the electrodes are provided on the inner surfaces of the bag in areas near the outlet portion.

3. A lubrication unit comprising a tank that stores a lubricant to be supplied to a lubrication-needed area of a rotating component and that has an outlet portion through which the lubricant flows out, the lubrication unit being provided adjacently to the lubrication-needed area, wherein
   the tank has a flexible bag in which the lubricant is stored,
   the bag is filled with the lubricant and allows the lubricant to flow out through the outlet portion as a volume of the bag decreases, and
   the lubrication unit further includes a pair of electrodes provided on opposite inner surfaces of the bag, and wiring sections electrically connected to the respective electrodes to detect electric continuity of a circuit formed as a result of contact between the electrodes.

* * * * *